United States Patent [19]

Williams et al.

[11] 4,144,719
[45] Mar. 20, 1979

[54] AIR CONDITIONING APPARATUS

[75] Inventors: Ronald L. Williams; Robert G. McKeen, both of Dayton, Wash.

[73] Assignee: Skyline Parts, Inc., Dayton, Wash.

[21] Appl. No.: 872,040

[22] Filed: Jan. 25, 1978

[51] Int. Cl.² .......................... B60H 3/04; F25D 23/12
[52] U.S. Cl. .......................................... 62/239; 62/244; 62/263
[58] Field of Search .................. 62/239, 243, 244, 263

[56] References Cited
U.S. PATENT DOCUMENTS

| | | | |
|---|---|---|---|
| 2,799,143 | 7/1957 | Weigel | 62/244 |
| 3,983,715 | 10/1976 | Hair, Jr. et al. | 62/243 |
| 4,098,093 | 7/1978 | Czyl | 62/244 |

Primary Examiner—Lloyd L. King
Attorney, Agent, or Firm—Wells, St. John & Roberts

[57] ABSTRACT

An air conditioning unit for heating or cooling the cab of a tractor or other vehicle. A rectangular housing is mounted to the roof of the cab. It includes front, back and side walls which are upright and spanned by a horizontal cover. A central transverse shaft is rotatably mounted within the housing and extends between the housing side walls. It rotatably carries blade assemblies for central blowers and side blowers. The housing is divided into front and rear compartments by a solid interior transverse partition which isolates the two sets of blowers. A compressor is mounted within the housing and also has a transverse shaft. A common hydraulic motor drives both the central transverse shaft and the drive shaft of the compressor. The front compartment includes an inside coil and air inlets for directing fresh air and return air through the inside coil. The rear compartment includes an outside coil. The two coils are interconnected with a compressor in the manner conventional to a heat pump system.

5 Claims, 4 Drawing Figures

AIR CONDITIONING APPARATUS

BACKGROUND OF THE INVENTION

This invention relates to air conditioning units adapted to be mounted to the roof of a vehicle cab, such as the cab of an agricultural tractor, combine or other vehicle. It is designed to provide economy in manufacture and ease in servicing and repair by utilizing a single shaft to mount the blowers for both the interior and exterior air needed in the unit. This shaft and the usual compressor are driven by a common motor assembly, preferably mounted to the exterior of the housing for ready access and servicing. The assembly provides a unit having a relatively low profile and effective air paths permitting use of large areas of coils for efficient cooling or heating of large volumes of air.

DESCRIPTION OF THE INVENTION

Figure 1:
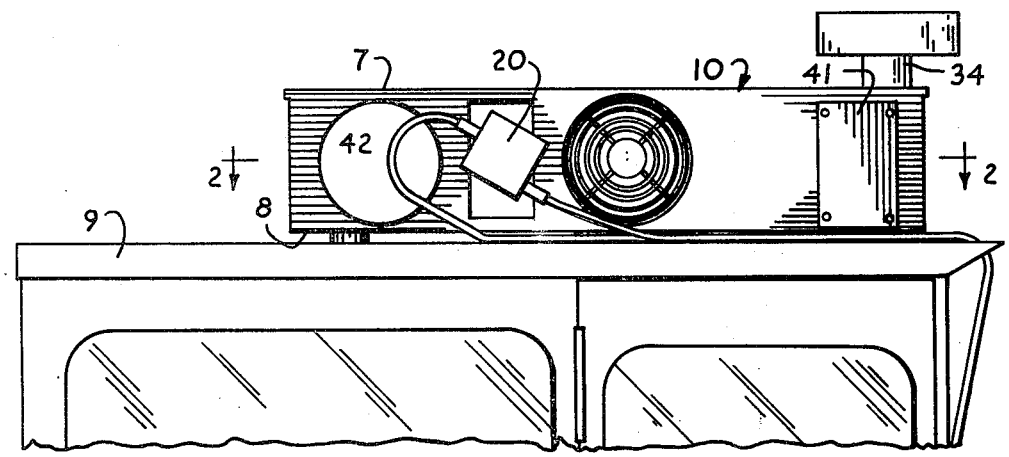
FIG. 1 is a fragmentary side view of a cab with the unit mounted on its roof.

The drawings illustrate an air conditioning unit constructed according to this disclosure. It comprises a rectangular enclosure or housing 10 which is adapted to be mounted to the upper roof surface of a vehicle cab 9. The housing includes a back wall 13, a front wall 14, and two opposed side walls 11 and 12. It further comprises a top panel 7, which serves as a removable cover, and a bottom panel 8. The housing forms a complete rectangular enclosure having a relatively low profile so as to not interfere with use of the vehicle and to minimize additional wind resistance.

A central transverse shaft 21 is rotatably journalled in the housing 10. It extends between the two side walls 11, 12. A first pair of blowers are illustrated as centrifugal fans 30. Fans 30 are located within housing 10 and serve to direct air from within the housing to the cab interior. The fans 30 each include a rotatable blade assembly that is coaxially mounted to shaft 21 intermediate the ends thereof. The coaxial blade assemblies of fans 30 rotate in unison with shaft 21.

The housing 10 is divided into front and back compartments by a solid interior transverse partition 19. Partition 19 extends between the top and bottom panels 7, 8 and separates a back compartment 17 within housing 10 from a front compartment 18. As is evident from FIG. 2, it also isolates the first blower mechanism comprising centrifugal fans 30 from the second blower mechanism comprising fans 28. Partition 19 further serves as the bearing support for the central transverse shaft 21.

Mounted within back compartment 17 is a conventional compressor unit 24, supported by a partial longitudinal wall 29. The drive shaft for compressor 24 is powered through belts and pulleys connected to the driven shaft 27 of a hydraulic motor 20 mounted to the exterior of wall 11. The driven shaft 27 is also interconnected to shaft 21 by another set of pulleys and an interconnecting belt. Thus, a single exterior hydraulic motor powers all of the rotating elements of the air conditioning unit, most of which are arranged along the single transverse shaft 21.

The back compartment 17 within housing 10 is spanned by a transverse outside coil 32 through which ambient air is circulated by the fans 28, which draw air through the rear wall 13 and discharge it through the side walls 11, 12. The area about driven shaft 27 and most of the belt mechanism is isolated from this flow of air.

Figure 2:
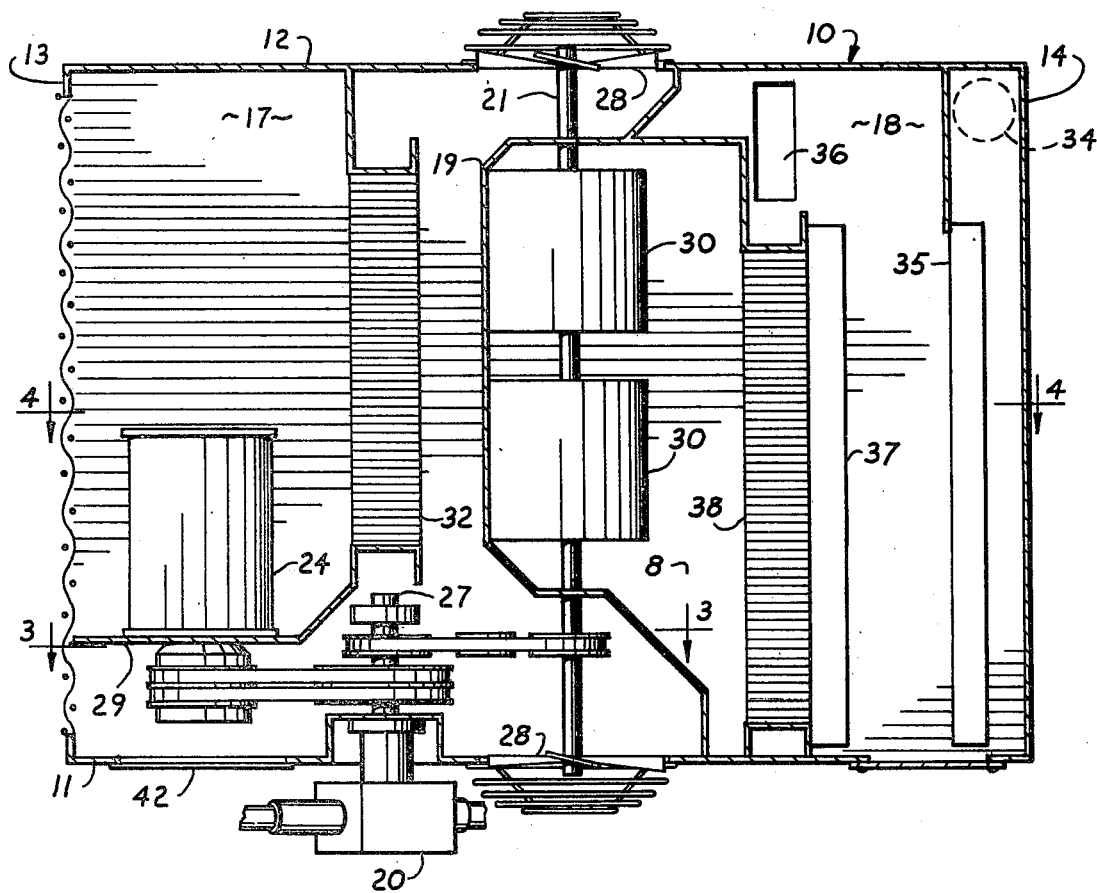
FIG. 2 is an enlarged sectional view taken through line 2—2 in FIG. 1.
Figure 3:
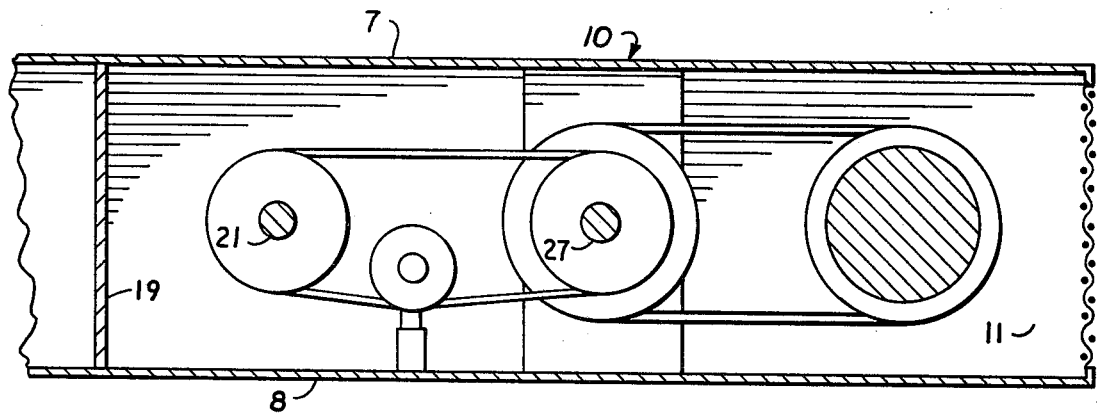
FIG. 3 is an enlarged sectional view taken along line 3—3 in FIG. 2.
Figure 4:
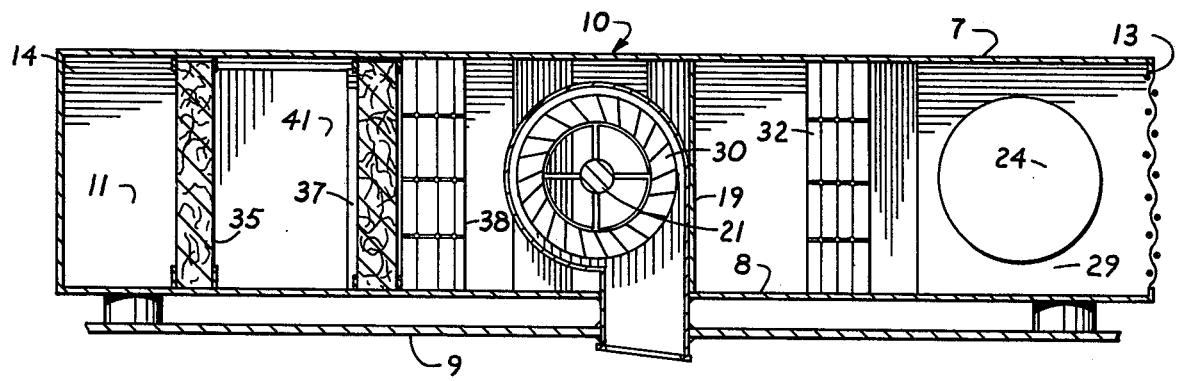
FIG. 4 is a sectional view taken along line 4—4 in FIG. 2.

Fresh air enters front compartment 18 through a pre-cleaner and duct 34 through the front corner of top panel 7 (FIG. 2). It is then directed through a transverse filter assembly 35 parallel to the front wall 14. This makeup air mixes with air from the interior of the cab, this return air being directed into housing 10 through an opening 36 in the bottom panel 8. The amount of return air from the cab is maintained at a volume such as to maintain slight pressurization within the cab interior due to the operation of the centrifugal fans 30. This interior pressurization prevents dust from entering through the cracks or seals about the cab periphery. The air within the front compartment 18 then passes through a final filter 37 and an inside coil 38. The coils 32 and 38 are connected in a heat pump refrigerant system including compressor 24, the normal details of such a system being well-known in this field.

The air conditioner described above is usable as a reversible heat pump to either warm or cool air being delivered to the cab by fans 30. When cooling, the inside coil 37 serves as an evaporator coil and outside coil 32 serves as a condenser coil. They are reversed in operation to heat the cab, inside coil 37 being then the condenser coil and outside coil 32 being the evaporator coil.

Access to the front compartment is provided by a hinged filter door 41 to enable one to service the filters shown at 35 and 37. Access to the compressor pulleys and belts is provided by a compressor cover 42, also mounted on side wall 12. As is evident in the drawings, this provides ready accessibility to the interior of housing 10 from the one side of the housing, and complete accessibility is available by removal of the top panel 7.

Various modifications might be made in the specific details without deviating from the general arrangement described above. For this reason, the following claims are submitted as definitions of the invention to be protected hereby.

Having described our invention, we claim:

1. A roof-mounted air conditioner unit for heating or cooling a cab of a vehicle, comprising:

a housing adapted to be fixed to the exterior roof surface of a vehicle cab, said housing defining an enclosure having upright front, back and opposed side walls;

a central transverse shaft rotatably journalled in the housing and extending between the side walls thereof;

first blower means located within said housing for directing air from within the housing to the cab interior, said first blower means including a rotatable blade assembly coaxially mounted to said shaft intermediate the ends thereof;

second blower means located within said housing for directing air from within the housing to the exterior thereof through at least one of said side walls, said second blower means including a rotatable blade assembly coaxially mounted to said shaft adjacent at least one end thereof;

solid interior transverse partition means fixed within said housing for isolating said first blower means from said second blower means;

a compressor mounted within said housing, said compressor having a transverse drive shaft;

motor means mounted to said housing and having a transverse driven shaft;

and motion transmitting means cooperatively coupled between the driven shaft of said motor means, said central transverse shaft, and said drive shaft of said compressor for rotating said central shaft and compressor during operation of the unit.

2. An air conditioning unit as set out in claim 1 wherein said interior transverse partition means rotatably journals said central transverse shaft and divides the housing into a front compartment containing the first blower means and a back compartment containing the second blower means;

air inlet means in said front compartment for directing air to said front compartment from both the cab interior and exterior;

and an inside coil located within said front compartment, said inside coil being operatively interposed between said air inlet means and said first blower means.

3. An air conditioning unit as set out in claim 1 wherein said interior transverse partition means rotatably journals said central transverse shaft and divides the housing into a front compartment containing said first blower means and a back compartment containing said second blower means;

air inlet means in said back compartment for directing ambient air to said back compartment from the exterior of the cab;

and a transverse outside coil located within said back compartment, said outside coil being operatively interposed between said air inlet means and said second blower means.

4. An air conditioning unit as set out in claim 1 wherein said interior transverse partition means rotatably journals said central transverse shaft and divides the housing into a front compartment containing first blower means and a back compartment containing the second blower means;

first air inlet means in said front compartment for directing air to said front compartment from both the cab interior and exterior;

a transverse inside coil located within said front compartment, said inside coil being operatively interposed between the first air inlet means and said first blower means;

second air inlet means in said back compartment for directing air to said back compartment from the cab exterior;

and a transverse outside coil located within said back compartment, said outside coil being operatively interposed between said second air inlet means and said second blower means.

5. An air conditioning unit as set out in claim 1 wherein said motor means comprises a hydraulic motor mounted to an exterior side wall of the housing, the driven shaft of the hydraulic motor being extended through the side wall to the housing interior, said motion transmitting means being located within the interior of the housing.

* * * * *